Sept. 15, 1925.
J. F. LINCOLN
ARC WELDING
Filed Jan. 29, 1923
1,553,543
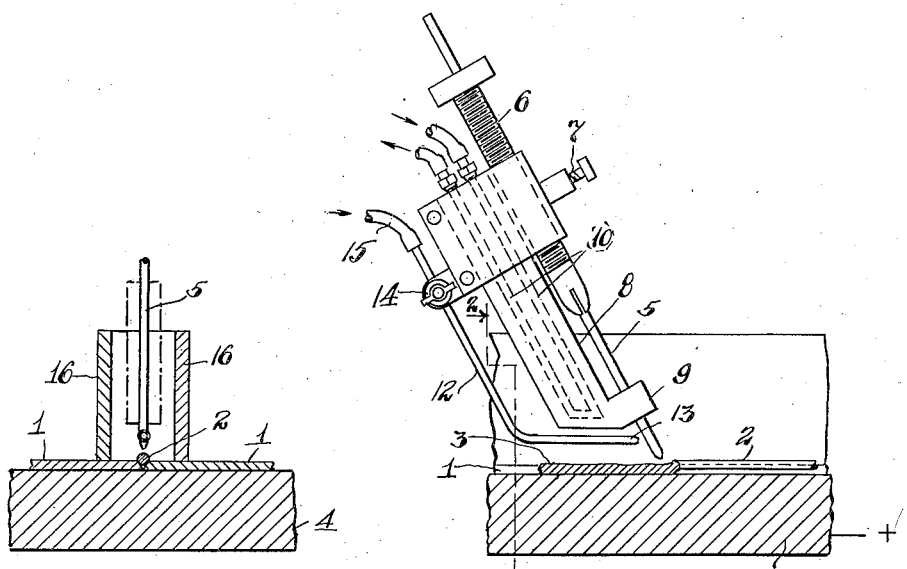
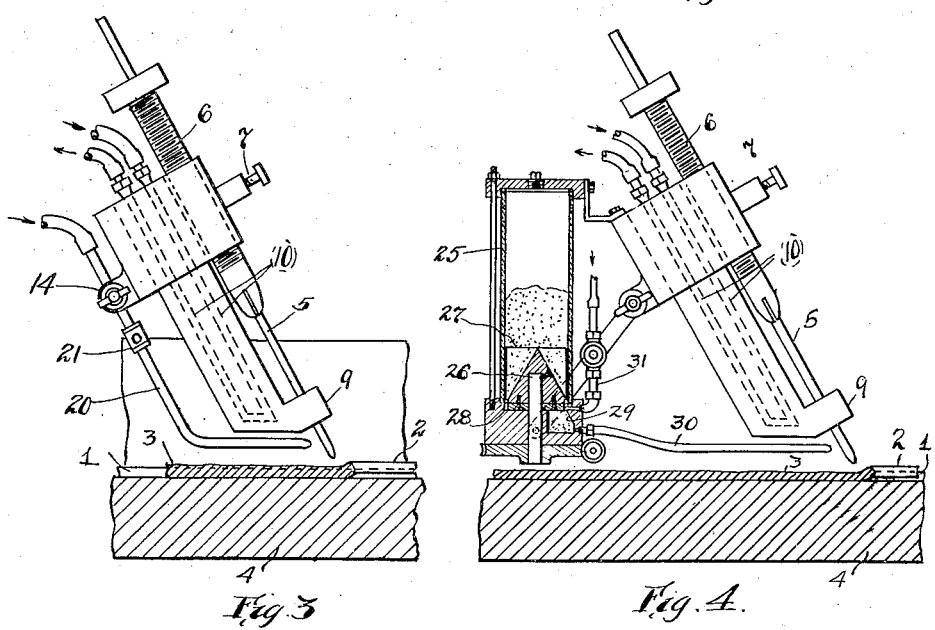
INVENTOR.
James F. Lincoln
BY
Fay Oberlin & Fay
ATTORNEYS Patented Sept. 15, 1925.

1,553,543

UNITED STATES PATENT OFFICE.

JAMES F. LINCOLN, OF CLEVELAND, OHIO, ASSIGNOR TO THE LINCOLN ELECTRIC COMPANY, OF CLEVELAND, OHIO, A CORPORATION OF OHIO.

ARC WELDING.

Application filed January 29, 1923. Serial No. 615,535.

*To all whom it may concern:*

Be it known that I, JAMES F. LINCOLN, a citizen of the United States, and a resident of Cleveland, county of Cuyahoga, and State of Ohio, have invented a new and useful Improvement in Arc Welding, of which the following is a specification, the principle of the invention being herein explained and the best mode in which I have contemplated applying that principle, so as to distinguish it from other inventions.

The present improvements have more particular regard to methods of electric welding, and of working metal by electricity in general, wherein an electric arc is struck between the part or parts to be fused and a carbon electrode that is moved relatively to such parts so as to cause the arc to traverse the work. One difficulty, practically universally encountered where metal parts are welded or otherwise worked by such method, is the oxidation of the metal, incidentally to its fusion under the intense heat of the arc, and the practical inability to thoroughly clear out such oxide from the metal before it again solidifies. It is true that by the proper use of a suitable fluxing agent the oxide remaining in the juncture or weld may be materially reduced, if not entirely eliminated; but it is no simple matter to maintain a proper supply of reducing agent at the point where needed, especially when the arc is unsteady or shifting as is apt to be the case.

One principal object of the present invention is to avoid the formation of oxide in the first place, at least in any substantial amount, this being accomplished by striking the arc in either a neutral or reducing atmosphere. At the same time, incidentally to the foregoing, a directional control of the arc is obtained which prevents the same from shifting or jumping about on the work and so insures a smooth even action of the arc and the production of a perfect weld.

To the accomplishment of the foregoing and related ends, the invention, then, consists of the steps and means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:—

Fig. 1 is a side elevation of an electrode holder in operative relation to the work, along with accessory parts for maintaining a neutral atmosphere about the arc and point on the work where the metal thereof is rendered molten by such arc; Fig. 2 is a transverse section of such electrode, work and accessory parts, the plane of the section being indicated by the line 2—2, Fig. 1; Fig. 3 is a modified form of the mechanism shown in Fig. 1, the same being more especially adapted to maintain a reducing atmosphere about the arc; and Fig. 4 is still another view, similar to Fig. 1, illustrating a modified form of construction whereby a powdered fluxing material may be supplied to the work at the point where the arc is operating thereon.

In the arrangement illustrated in the several figures of the drawing, the work is shown as consisting of two sheets 1, 1, which are disposed with the edges thereof that are to be joined together in substantially abutting relation. Sufficient space, however, is left between such edges, or ordinarily the latter are slightly beveled, so that a filler strip or wire 2 may be inserted therebetween. Such element 2 ordinarily will be of the same material, i. e. iron, as the metal of the sheets, but may, if desired, contain special alloying constituents, or even be of a different metal entirely, so far as the practice of the present invention is concerned. The object of the illustrated operation, it will be understood, is to melt down such element 2 and interfuse the same with the edges of the sheet 1, so that the resultant seam 3, as shown at the left in Figs. 1, 3 and 4, will be of substantially the same thickness as such sheets and of equal, if not greater, strength and ductility than the latter.

As shown, the sheets 1, with such strip 2 interposed therebetween, are preferably supported on a bed or anvil 4 which will ordinarily be of copper or other heat conducting material, and in order to increase the cooling effect of such bed, it may be made hollow with suitable connections (not shown) for circulating water through the interior.

The welding, as previously indicated, is accomplished by means of an electric arc, a carbon electrode 5 being suitably supported to traverse the line of the weld, or, in other words, to move along the rod or wire 2 with its lower end spaced a short distance therefrom, so that an arc will be struck, the work always being connected with the source of current supply on the positive and such electrode on the negative side.

While the electrode may be directly manipulated by the operator, it will preferably be supported by suitable mechanism, whereby the aforesaid traversing movement is accomplished, and at the same time automatic means (not shown) may be provided for feeding the electrode towards the work or preferably for advancing or retracting same so as to maintain the end of the electrode always at a uniform distance from the work. Particularly where thus mechanically supported and fed, a holder of the special design illustrated in Figs. 1 and 2 will be provided for the electrode. This holder comprises a chuck member 6 wherein the carbon pencil constituting the electrode proper is frictionally held, said chuck being externally threaded for engagement by a spring pressed plunger 7, transversely movably mounted in said holder. The welding current is supplied to the electrode by a separate conductor member 8 that is in effect integral with the body of the holder and has an offset portion 9 at its lower end through an aperture in which the electrode passes in closely fitting relation. Said conductor member 8 is further provided with an interior passageway 10 whereby a cooling fluid, such as water for example, may be carried lengthwise of the same, such passage being carried as close to the end 9 as possible. In addition there is attached to the body of the holder a tube 12 that is bent or otherwise disposed so that its lower end, which terminates in a jet 12, is located immediately to the rear of the lower projecting end of the electrode, i. e., immediately in the rear of the arc formed between such electrode end and the work. This tube is adjustably secured to the body of the holder by a clamp 14 which permits the location of the jet 13 to be shifted with reference to such arc so as to secure the desired effect from the stream of gas which it is designed should be supplied to said tube through a suitable flexible connection 15.

By thus supplying to tube 12 a neutral gas, such for example as nitrogen, it will be obvious that the arc will at least in the main be surrounded by an atmosphere of such gas and the formation of objectionable oxide will be substantially eliminated. The maintenance of such a neutral atmosphere is further assisted by placing on each side of the line of weld a bar 16, such bars being of such weight in themselves, or having such additional pressure applied thereto, as to cause them to clamp the edges of the sheets that form the work firmly upon the bed 4. These bars are preferably of metal, although any conductive material suitable for electrode use may be employed and aside from such other functions as they may subserve will confine in the space therebetween the gas delivered as foresaid through the tube 12.

Instead of supplying a neutral gas through the tube 12, a reducing gas, for example carbon-monoxide, may be thus supplied so as to maintain an atmosphere of such gas about the arc; or preferably in place of a simple tube being employed, a tube 20 of similar form, but arranged to operate as a Bunsen burner, will be substituted, as shown in Fig. 3. Such burner will be supplied with a suitable combustible gas and the admixture of air with such gas controlled by an adjustable apertured collar 21 in the usual way.

Since it may be desirable even where such a neutral or reducing atmosphere is thus maintained about the arc nevertheless to supply a limited quantity of fluxing material to the metal as it is rendered molten by the action of the arc, I show in Fig. 4 an arrangement whereby such fluxing material is thus supplied in powdered form to the work at a point adjacent such arc. The device thus illustrated includes a vertically disposed cylindrical container 25 preferably supported at the rear of the electrode holder and directly therefrom, although the location of said container and the manner of its support may be varied without affecting the functioning of the device. Rotatably mounted in the bottom of said container is a cone-shaped member 26 formed with radial fins 27 and, at its base, with teeth 28. Such fins keep the powdered flux material stirred up and the teeth serve to discharge the same in regulated amount into a small chamber 29 from which leads a discharge duct 30. The teeth are covered over at the point of discharge and an air supply line 31 is connected to direct a stream of air against such teeth at this point, the air then passing out through chamber 29 and duct 30 carrying the material with it, depositing such material at exactly the right point to be most effective, the application of the flux to the weld being thus accomplished in a very uniform manner and without waste of flux.

The device just described may, of course, be used to introduce the fluxing material at the point of weld without necessarily combining the air stream therewith; in other words, by simply leaving off or shortening up the discharge duct 30, the material can be allowed to fall directly onto the weld while the welding is going on. The air stream, or other equivalent means, may be utilized independently to control or direct the "blow" of the arcs.

In addition to supplying a neutral or reducing atmosphere to the arc, the effect of directing a gaseous jet from tube 12, 20 or 22, as the case may be, will be to "blow" such arc positively either forwardly or laterally depending upon the position of such jet with respect to the arc. In this way, the tendency of the latter to jump from one spot to another, or to become "wild" is restrained and a smooth, even operation insured.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In metal working by electricity, the steps which consist in placing on the work two spaced approximately parallel bars, one on each side of the line to be welded, establishing an arc between the work and a suitable electrode, causing such arc to traverse such line, and simultaneously introducing a non-oxidizing atmosphere into the space between such bars adjacent such arc.

2. In metal working by electricity, the steps which consist in placing on the work two spaced approximately parallel bars, one on each side of the line to be welded, establishing an arc between the work and a suitable electrode, causing such arc to traverse such line, and simultaneously introducing a neutral gas into the space between such bars adjacent such arc.

3. In metal working by electricity, the steps which consist in placing on the work two spaced approximately parallel bars, one on each side of the line to be welded, establishing an arc between the work and a suitable electrode, causing such arc to traverse such line, and simultaneously directing a jet of non-oxidizing gas between such bars and against such arc.

4. In metal working by electricity, the steps which consist in placing on the work two spaced approximately parallel bars, one on each side of the line to be welded, establishing an arc between the work and a suitable electrode, causing such arc to traverse such line, and simultaneously directing a jet of neutral gas between such bars and against such arc.

5. In metal working by electricity, the steps which consist in placing on the work two spaced approximately parallel bars, one on each side of the line to be welded, establishing an arc between the work and a suitable electrode, causing such arc to traverse such line, directing a jet of non-oxidizing gas into the space between such bars so as to exercise directional control upon such arc, and supplying a powdered fluxing material by means of such jet.

Signed by me, this 27th day of January, 1923.

JAMES F. LINCOLN.